United States Patent
Tang et al.

(10) Patent No.: US 11,783,491 B2
(45) Date of Patent: Oct. 10, 2023

(54) OBJECT TRACKING METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Mengyun Tang, Shenzhen (CN); Wen Zhou, Shenzhen (CN); Yongjun Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 172 days.

(21) Appl. No.: 17/472,292

(22) Filed: Sep. 10, 2021

(65) Prior Publication Data

US 2021/0407103 A1    Dec. 30, 2021

Related U.S. Application Data

(63) Continuation of application No. PCT/CN2020/109272, filed on Aug. 14, 2020.

(30) Foreign Application Priority Data

Aug. 29, 2019 (CN) .......................... 201910810167.7

(51) Int. Cl.
  *G06T 7/215* (2017.01)
  *G06T 7/246* (2017.01)
  *G06V 40/20* (2022.01)
(52) U.S. Cl.
  CPC .............. *G06T 7/215* (2017.01); *G06T 7/251* (2017.01); *G06V 40/25* (2022.01); *G06T 2207/30196* (2013.01)

(58) Field of Classification Search
  CPC ..................... G06T 7/215; G06T 7/251; G06T 2207/30196; G06T 2207/10016;
(Continued)

(56) References Cited

U.S. PATENT DOCUMENTS 9,465,994 B1  10/2016 Mishra
9,659,380 B1   5/2017 Castellani et al.
(Continued)

FOREIGN PATENT DOCUMENTS

CN     104011740 A    8/2014
CN     104683803 A    6/2015
(Continued)

OTHER PUBLICATIONS

Moving Object Tracking by Optimizing Active Models—1998 (Year: 1998).*
(Continued)

*Primary Examiner* — Nizar N Sivji
(74) *Attorney, Agent, or Firm* — ANOVA LAW GROUP PLLC

(57) ABSTRACT

An object tracking method includes: obtaining a video stream acquired by a camera, and decoding the video stream to obtain a plurality of image frames; and obtaining position information of a target object in a current image frame. Obtaining the position information of the target object in the current image frame includes: performing, in response to that the current image frame is a first-type image, object detection on the current image frame to obtain the position information of the target object in the current image frame; and predicting, in response to that the current image frame is a second-type image, the position information of the target object in the current image frame based on motion vectors of a previous image frame and a position the target object in the previous image frame.

16 Claims, 11 Drawing Sheets

(58) Field of Classification Search
CPC . G06T 2207/20081; G06T 2207/20084; G06T 2207/30232; G06T 7/246; G06V 40/25; G06V 20/40; G06V 40/10; G06V 10/25
See application file for complete search history.

(56) References Cited

U.S. PATENT DOCUMENTS

| | | | | |
|---|---|---|---|---|
| 2007/0070201 | A1* | 3/2007 | Yokomitsu | G06T 7/246 348/169 |
| 2011/0142283 | A1* | 6/2011 | Huang | G06T 7/254 382/103 |
| 2013/0177203 | A1 | 7/2013 | Koo et al. | |
| 2014/0369555 | A1* | 12/2014 | Zhong | G11B 27/02 382/103 |
| 2015/0209002 | A1 | 7/2015 | De et al. | |
| 2016/0140394 | A1* | 5/2016 | Lee | G06V 20/40 382/103 |
| 2016/0267325 | A1* | 9/2016 | Sundaresan | G06T 7/215 |
| 2017/0053167 | A1* | 2/2017 | Ren | G06T 3/40 |
| 2017/0286774 | A1* | 10/2017 | Gaidon | G06T 7/248 |
| 2017/0337435 | A1* | 11/2017 | Uliyar | G06V 30/19173 |
| 2018/0061076 | A1 | 3/2018 | Wang et al. | |

FOREIGN PATENT DOCUMENTS

| | | |
|---|---|---|
| CN | 105069408 A | 11/2015 |
| CN | 106022238 B | 5/2016 |
| CN | 105654512 A | 6/2016 |
| CN | 107798272 A | 8/2016 |
| CN | 106797451 A | 5/2017 |
| CN | 107483953 A | 12/2017 |
| CN | 108024113 A | 5/2018 |
| CN | 108280843 A | 7/2018 |
| CN | 109325961 A | 2/2019 |
| CN | 109685797 A | 4/2019 |
| CN | 109886243 A | 6/2019 |
| CN | 110516620 A | 11/2019 |
| JP | 2017102622 A | 6/2017 |
| WO | WO-2017042710 A1 * | 3/2017 ............ B60W 40/04 |
| WO | 2018153294 A1 | 8/2018 |

OTHER PUBLICATIONS

The World Intellectual Property Organization (WIPO) International Search Report for PCT/CN2020/109272 dated Nov. 18, 2020 6 Pages (including translation).

Shaoqing Ren et al., "Faster R-CNN: Towards Real-Time Object Detection with Region Proposal Networks," In Advances in neural information processing systems, 2015. 9 pages.

Kaiming He et al., "Mask R-CNN," In Proceedings of the IEEE international conference on computer vision, 2017, pp. 2961-2969. 9 pages.

Joseph Redmon et al., "You Only Look Once: Unified, Real-Time Object Detection," In Proceedings of the IEEE conference on computer vision and pattern recognition, 2016, pp. 779-788. 10 pages.

Joseph Redmon et al., "YOLO9000: Better, Faster, Stronger," In Proceedings of the IEEE conference on computer vision and pattern recognition, 2017, pp. 7263-7271. 9 pages.

Joseph Redmon et al., "YOLOv3: An Incremental Improvement," arXiv:1804.02767, Apr. 8, 2018. 5 pages.

Ke Sun et al., "Deep High-Resolution Representation Learning for Human Pose Estimation," arXiv:1902.09212, Feb. 25, 2019. 12 pages.

Yilun Chen et al., "Cascaded Pyramid Network for Multi-Person Pose Estimation," In Proceedings of the IEEE Conference on Computer Vision and Pattern Recognition, 2018, pp. 7103-7112. 10 pages.

The Japan Patent Office (JPO) Notification of Reasons for Refusal for Application No. 2021-556570 and Translation dated Oct. 28, 2022 11 Pages.

China National Intellectual Property Administration (CNIPA) Office Action 1 for 201910810167.7 dated Apr. 27, 2023 16 Pages (including translation).

Wan Qin et al."Journal of Hunan Institute of Engineering (Natural Science Edition), 04", "Real time tracking of multiple moving targets based on Kinect cameras", Dec. 19, 2018 (Dec. 19, 2018).

K. Kale et al. "2015 4th International Conference on Reliability, Infocom Technologies and Optimization (ICRITO) (Trends and Future Directions)", "Moving object tracking using optical flow and motion vector estimation", Dec. 17, 2015 (Dec. 17, 2015).

* cited by examiner

OBJECT TRACKING METHOD AND APPARATUS, STORAGE MEDIUM, AND ELECTRONIC DEVICE

CROSS-REFERENCES TO RELATED APPLICATIONS

This application is a continuation application of PCT Patent Application No. PCT/CN2020/109272, entitled "Object tracking method and apparatus, storage medium, and electronic device" and filed on Aug. 14, 2020, which claims priority to Chinese Patent Application No. 201910810167.7, entitled "OBJECT TRACKING METHOD AND APPARATUS, STORAGE MEDIUM, AND ELECTRONIC DEVICE" and filed on Aug. 29, 2019, which is incorporated herein by reference in its entirety.

FIELD OF THE TECHNOLOGY

The present disclosure relates to the field of artificial intelligence (AI) technologies, and in particular, to an object tracking method and apparatus, a storage medium, and an electronic device.

BACKGROUND OF THE DISCLOSURE

As a core of AI, computer vision (CV) technologies have been applied to a plurality of fields currently. For example, as an important research direction of the CV technologies, object tracking is widely applicable at present, and can be applied to scenarios such as video surveillance, man-machine interaction, and unmanned driving.

Using single-camera multi-object tracking as an example, when object tracking is performed by using the related art, a video stream acquired by a camera is first decoded into a plurality of image frames. Next, object detection is performed, based on an object detection algorithm, on each of the decoded plurality of image frames, and the object tracking is implemented according to results of the object detection on the plurality of image frames.

Because object detection needs to be performed on each image frame, the detection is relatively time-consuming. Particularly, when a high-resolution image is detected, the larger the image for object detection, the slower the detection, which severely affects the performance of object tracking, resulting in difficulty in achieving real-time tracking. To achieve the effect of real-time tracking, in the related art, a few images are extracted for object detection from all decoded images, and no processing is performed on remaining images. Because information of all the images is not all used, the accuracy of a tracking result is severely restricted.

Based on the above, how to perform object tracking to ensure tracking accuracy while improving the tracking speed becomes an urgent problem for a person skilled in the art to resolve.

SUMMARY

Embodiments of the present disclosure provide an object tracking method and apparatus, a storage medium, and an electronic device, to ensure tracking accuracy while improving the tracking speed. The technical solutions are as follows:

According to an aspect, an object tracking method is provided, applicable to an electronic device, the method including: obtaining a video stream acquired by a camera, and decoding the video stream to obtain a plurality of image frames; and obtaining position information of a target object in a current image frame. Obtaining the position information of the target object in the current image frame includes: performing, in response to that the current image frame is a first-type image, object detection on the current image frame to obtain the position information of the target object in the current image frame; and predicting, in response to that the current image frame is a second-type image, the position information of the target object in the current image frame based on motion vectors of a previous image frame and a position the target object in the previous image frame.

According to another aspect, an object tracking apparatus is provided, including: an obtaining module, configured to obtain a video stream acquired by a camera; a decoding module, configured to decode the video stream to obtain a plurality of image frames; and a processing module, configured to: obtain position information of a target object in a current image frame. Obtaining the position information of the target object in the current image frame includes: performing, in response to that the current image frame is a first-type image, object detection on the current image frame to obtain the position information of the target object in the current image frame; and predicting, in response to that the current image frame is a second-type image, the position information of the target object in the current image frame based on motion vectors of a previous image frame and a position the target object in the previous image frame.

According to another aspect, a non-transitory storage medium is provided, storing at least one instruction, the at least one instruction being loaded and executed by a processor to implement: obtaining a video stream acquired by a camera, and decoding the video stream to obtain a plurality of image frames; and obtaining position information of a target object in a current image frame. Obtaining the position information of the target object in the current image frame includes: performing, in response to that the current image frame is a first-type image, object detection on the current image frame to obtain the position information of the target object in the current image frame; and predicting, in response to that the current image frame is a second-type image, the position information of the target object in the current image frame based on motion vectors of a previous image frame and a position the target object in the previous image frame.

According to another aspect, an electronic device is provided, including a processor and a memory, the memory storing at least one instruction, the at least one instruction being loaded and executed by the processor to implement: obtaining a video stream acquired by a camera, and decoding the video stream to obtain a plurality of image frames; and obtaining position information of a target object in a current image frame. Obtaining the position information of the target object in the current image frame includes: performing, in response to that the current image frame is a first-type image, object detection on the current image frame to obtain the position information of the target object in the current image frame; and predicting, in response to that the current image frame is a second-type image, the position information of the target object in the current image frame based on motion vectors of a previous image frame and a position the target object in the previous image frame.

The technical solutions provided in the embodiments of the present disclosure bring about the following beneficial effects:

After the video stream acquired by the camera is obtained, the video stream is first decoded to obtain a plurality of image frames. Next, the following processing is sequentially performed on the decoded plurality of image frames: determining, for the to-be-detected current image frame, whether the current image frame is the first-type image or the second-type image; performing, in response to that the current image frame is a first-type image, object detection on the current image frame to obtain the position information of the target object in the current image frame; and predicting, in response to that the current image frame is a second-type image, the position information of the target object in the current image frame based on motion vectors of a previous image frame and a position the target object in the previous image frame. Based on the above, it can be learned that, in this embodiment of the present disclosure, the decoded plurality of image frames are classified into two types. Object detection is performed on the first-type image. Motion detection is performed on the second-type image based on motion vectors. That is, spatial motion information of a tracked object is obtained by using motion vectors. The object tracking method not only utilizes decoded information of all the images, but also avoids the problem of relatively slow detection caused by object detection on the images frame by frame, which not only ensures the real-time tracking speed, but also ensures the accuracy of an obtained tracking result, thereby greatly improving the object tracking efficiency, and reducing consumption of time and resources.

BRIEF DESCRIPTION OF THE DRAWINGS

To describe the technical solutions in the embodiments of the present disclosure more clearly, the accompanying drawings required for describing the embodiments are briefly described hereinafter. Apparently, the accompanying drawings in the following descriptions show merely some embodiments of the present disclosure, and a person of ordinary skill in the art may obtain other accompanying drawings according to these accompanying drawings without creative efforts.

DESCRIPTION OF EMBODIMENTS

Figure 1:
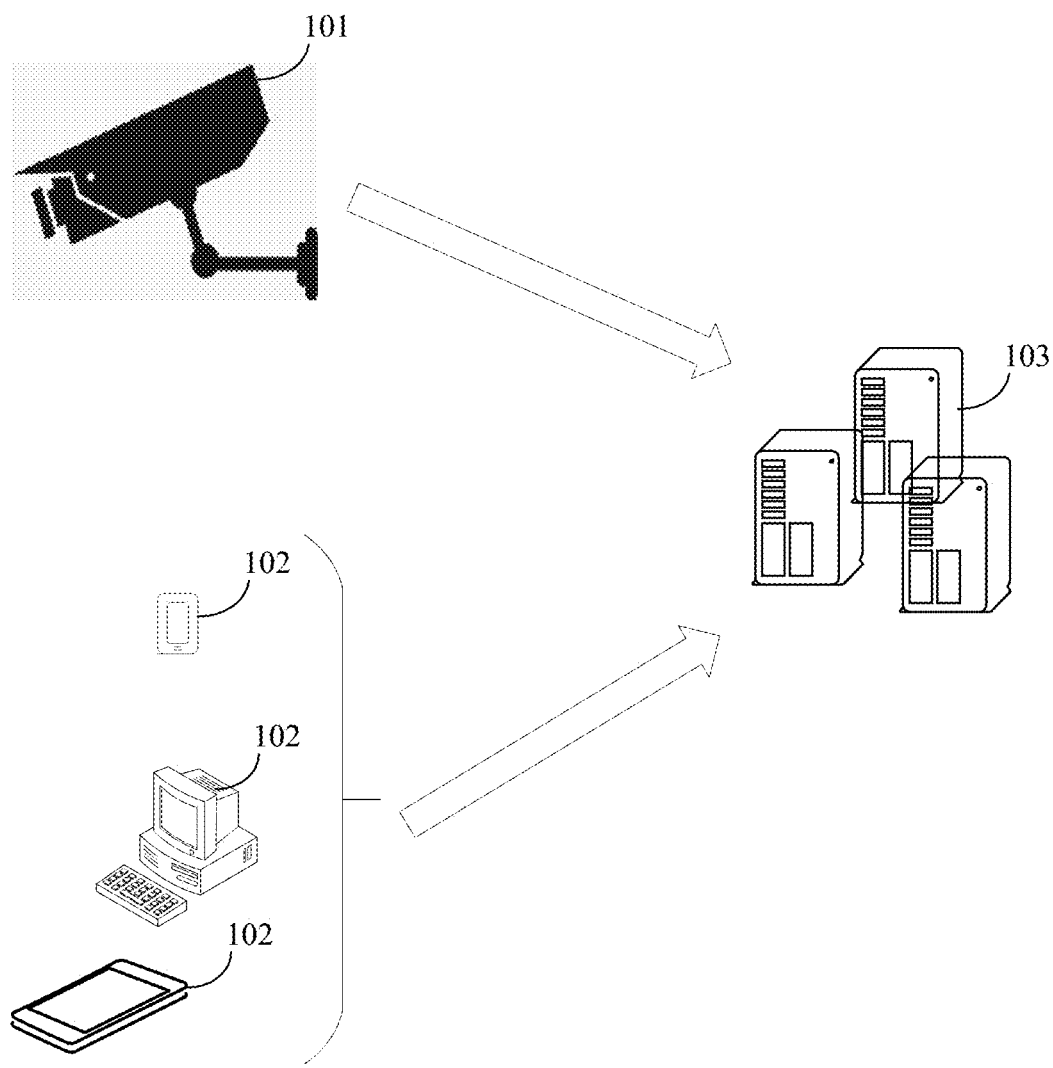
FIG. 1 is a schematic diagram of an implementation environment of an object tracking method according to an embodiment of the present disclosure.

To make the objectives, technical solutions, and advantages of the present disclosure clearer, implementations of the present disclosure are further described below in detail with reference to the accompanying drawings.

It is to be understood that, "at least one" refers to "one or more". For example, "at least one pedestrian" may refer to any integral number of pedestrians, the integral number being greater than or equal to one, for example, one pedestrian, two pedestrians, or three pedestrians. "A plurality of" refers to "two or more". For example, "a plurality of pedestrians" may refer to any integral number of pedestrians, the integral number being greater than or equal to two, for example, two pedestrians or three pedestrians.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, smart customer service, and video surveillance. It is believed that with the development of technologies, the AI technology will be applied to more fields, and play an increasingly important role.

The object tracking solution provided in the embodiments of the present disclosure can be applied to fields such as video surveillance and unmanned driving, and relate to CV technologies of AI, deep learning technologies, and the like.

The CV is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, CV studies related theories and technologies and attempts to establish an AI system that can obtain information from images or multi-dimensional data. The CV technology generally includes technologies such as image processing, image recognition, image semantic understanding, image retrieval, optical character recognition (OCR), video processing, video semantic understanding, video content/behavior recognition, three-dimensional object reconstruction, a three-dimensional (3D) technology, virtual reality (VR), augmented reality (AR), synchronous positioning, and map construction, and further include biological feature recognition technologies such as common face recognition and fingerprint recognition.

Deep learning is a subcategory of machine learning (ML). A deep neural network is literally understood as a deep layer neural network. In an example, when a hidden layer in a simple single-layer neural network is extended into a plurality of layers, a deep neural network is obtained. ML is a multi-field interdisciplinary subject involving the probability theory, statistics, the approximation theory, convex analysis, the algorithm complexity theory, and the like. ML specializes in studying how a computer simulates or implements a human learning behavior to acquire new knowledge or skills, and reorganize an existing knowledge structure, so as to keep improving its performance. ML is a core of the AI, is a basic way to make the computer intelligent, and is applied to various fields of the AI. ML and deep learning generally include technologies such as an artificial neural network, a belief network, reinforcement learning, transfer learning, inductive learning, and learning from demonstrations.

In addition, the object tracking solution provided in the embodiments of the present disclosure further relates to the field of cloud technologies. The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing. Exemplarily, the embodiments of the present disclosure relate to an AI cloud service in the field of cloud technologies.

An object tracking method provided in the present disclosure is described by using the following embodiments.

Before the embodiments of the present disclosure are explained and described in detail, some terms involved in the embodiments of the present disclosure are explained and described first.

Object detection: Object detection is to detect and identify a position and a category of an object in an image, for example, a person, a car, an animal, or a plant.

The object detection includes two tasks: detection and identification. The detection task is to determine a specific position of a to-be-detected target object in an image, and the identification task is to determine a category of the target object.

In other words, the object detection generally includes two processes: one process is predicting the category of the object and, and an other process is drawing a bounding box surrounding the object.

The object detection is the basis of many CV applications such as instance segmentation, key point detection, and face recognition. In addition, the object detection is widely applied to fields such as video surveillance, autonomous vehicle, and human tracking.

Human skeleton key point detection (pose estimation): Human skeleton key point detection is to detect positions of human body key parts such as eyes, ears, the nose, the mouth, shoulders, elbows, hips, and knees by using an image in which a human body has been detected as an input.

The human skeleton key point detection is the basis of many CV tasks such as behavior identification, person tracking, and gait recognition.

Object tracking: Object tracking refers to determining a position, a size, or a movement trajectory of a moving object of interest in a video sequence. The object tracking is one of the basic functions of video analysis in the field of CV.

The movement trajectory of the object is formed by connecting determined positions of the object in the video sequence. The size of the bounding box surrounding the object can reflect the size of the object.

Single-camera multi-object tracking: Single-camera multi-object tracking refers to obtaining positions, sizes, or movement trajectories of a plurality of objects of interest from a video sequence captured by a single camera.

Motion vector: A motion vector is two-dimensional data, and is generally represented as (MVx, MVy) in a rectangular coordinate system.

In the embodiments of the present disclosure, motion vectors of each of two adjacent image frames are extracted from between the two adjacent image frames. The motion vectors indicate relative displacements of pixels between the two adjacent image frames. That is, there is a pixel movement between the two adjacent image frames. In other words, a pixel in the previous image frame has a position change in the current image frame. In some embodiments, a previous image frame may refer to an image frame immediately preceding the current image frame. The change is a motion vector of the pixel. In an example, in the embodiments of the present disclosure, for each image frame decoded from a video stream acquired by a camera, a motion vector of a pixel of which a coordinate position is (x, y) in the image frame is $(d_x, d_y)$.

An implementation environment of an object tracking method provided in the embodiments of the present disclosure is described below.

As shown in FIG. 1, the implementation environment includes a camera 101, a terminal 102, and a server 103.

In an example, the object tracking method provided in the embodiments of the present disclosure is applicable to a single-camera multi-object tracking scenario. That is, there is one camera 101. In the scenario, the camera 101 may be a fixed camera or a mobile camera. This is not specifically limited in the embodiments of the present disclosure.

In the embodiments of the present disclosure, the terminal 102 can initiate an object tracking request to the server 103, to request the server 103 to perform object tracking for a specific camera. The type of the terminal 102 may include, but is not limited to, a smartphone, a tablet computer, a desktop computer, a notebook computer, and the like.

In one embodiment, a specific application is installed on the terminal 102, and the terminal 102 performs data communication with the server 103 by using the specific application.

In addition, the terminal 102 may further display a video stream acquired by the camera 101, and display a result of the object tracking returned by the server 103. This is not specifically limited in the embodiments of the present disclosure.

The server 103 may be implemented as an independent server or a server cluster.

This is not specifically limited in the embodiments of the present disclosure.

As described above, object tracking in the related art either is relatively time-consuming, which severely affects the performance of the object tracking, resulting in difficulty in achieving real-time tracking, or can achieve real-time tracking without completely using information of all images, resulting in impact on the accuracy of a tracking result. In view of the foregoing problem, the embodiments of the present disclosure provide a motion vector-based object tracking method. Application scenarios of the method include, but are not limited to, single-camera multi-object tracking.

The method not only utilizes information of all images, but also prevents frame-by-frame object detection from causing the problems of relatively slow detection and further a failure to achieve real-time tracking. That is, the method not only ensures the real-time tracking speed, but also ensures the accuracy of an obtained tracking result.

Figure 2:
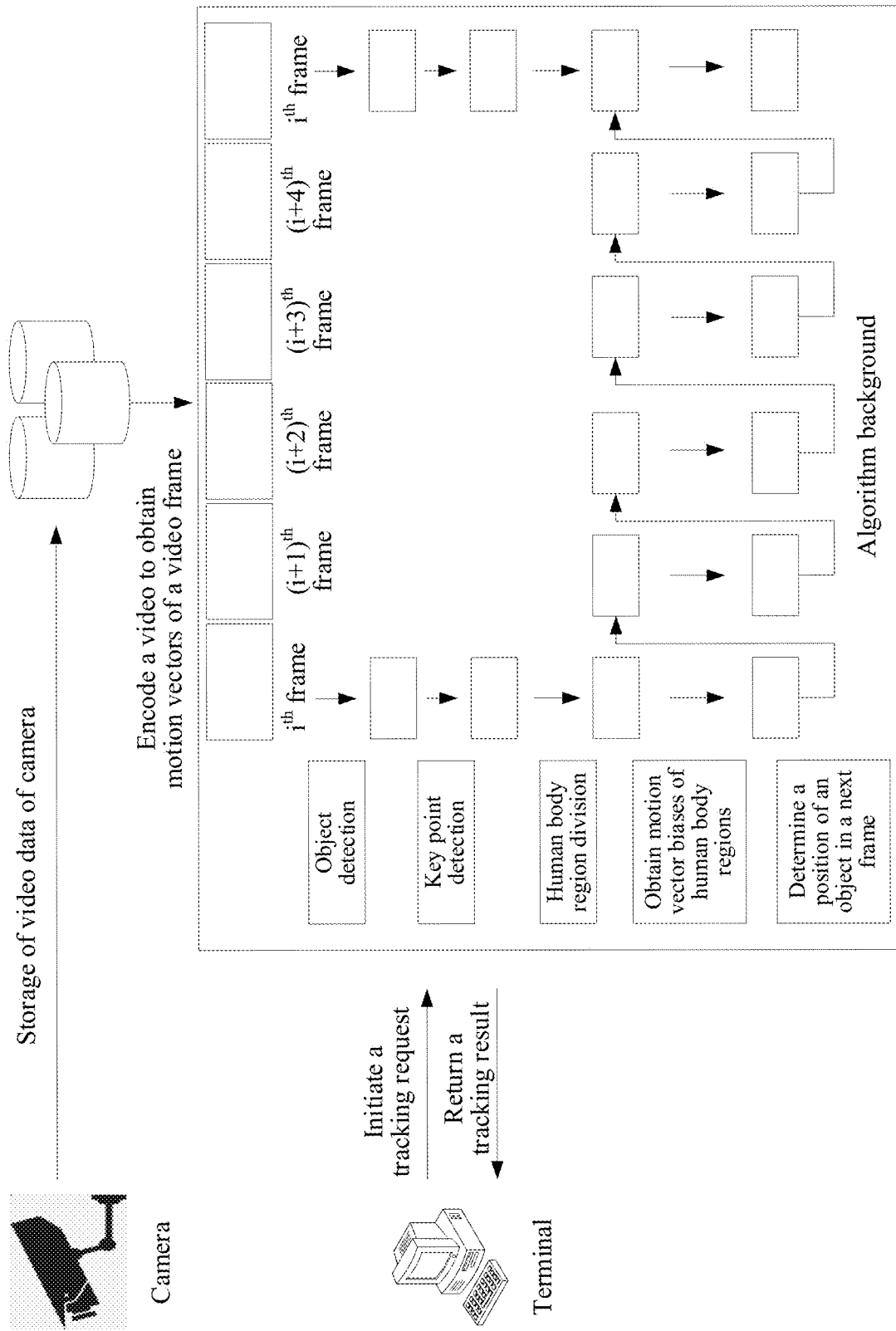
FIG. 2 is a diagram of a system architecture related to an object tracking method according to an embodiment of the present disclosure.

Using the implementation environment shown in FIG. 1 and a system architecture shown in FIG. 2 as an example, the video stream acquired by the camera 101 is stored for backup on the server 103. When the terminal 102 initiates an object tracking request for the camera 101 to the server 103, the server 103 obtains the video stream acquired by the camera 101, and decodes the video stream to obtain a plurality of image frames. In addition, the server 103 extracts motion vectors of each of the plurality of image frames.

In this embodiment of the present disclosure, the decoded plurality of image frames are classified into frames for detection and frames for tracking. The server 103 processes the frames for detection and the frames for tracking in different manners.

The first decoded image frame is a frame for detection. One frame for detection may be generally followed by a plurality of frames for tracking. The densities of the frames for detection and the frame for tracking may be set according to a specific scenario. This is not specifically limited in the embodiments of the present disclosure. That is, a quantity of the frames for detection only occupies a small proportion of a total quantity of images, and a quantity of the frames for tracking is greater than the quantity of the frames for detection.

As shown in FIG. 2, the server 103 performs object detection and key point detection on the frames for detection, and performs a tracking operation on the frames for tracking, that is, extracts motion vectors of each of two adjacent image frames from between the two adjacent image frames, and collects statistics of the motion vectors by regions to locate positions of an object in the image frames, and further determines a movement direction of the tracked object in a real scenario based on the located positions, thereby achieving the tracking of the object.

In other words, the server 103 performs object detection on the frames for detection, while the frames for tracking are used for motion detection, to determine whether a moving object exists. That is, the server 103 extracts motion vectors of each of two adjacent image frames from between the two adjacent image frames, and obtains spatial motion information of the tracked object by collecting statistics of directions of the motion vectors, so as to determine a moving direction of the tracked object, thereby achieving the tracking of the object.

In the method provided in this embodiment of the present disclosure, motion vectors are used for the first time for object tracking, which effectively reduces the feature search space and further improves the object tracking efficiency. In addition, the tracking speed is significantly improved because object detection is performed on some images (frames for detection), and the accuracy of an obtained tracking result is further ensured because information of all the images is used.

In another embodiment, after obtaining the tracking result, the server 103 may further push a tracking result to other business logic, such as regional control, loitering detection, multi-camera multi-object tracking, or video structuring, in addition to choosing to push the tracking result to the terminal 102 for display on a front end. This is not specifically limited in the embodiments of the present disclosure.

The object tracking method provided in the embodiments of the present disclosure is described below in detail.

The terms "first", "second", "third", "fourth", and the like described below are intended to distinguish between similar objects but do not constitute any other limitation.

Figure 3:
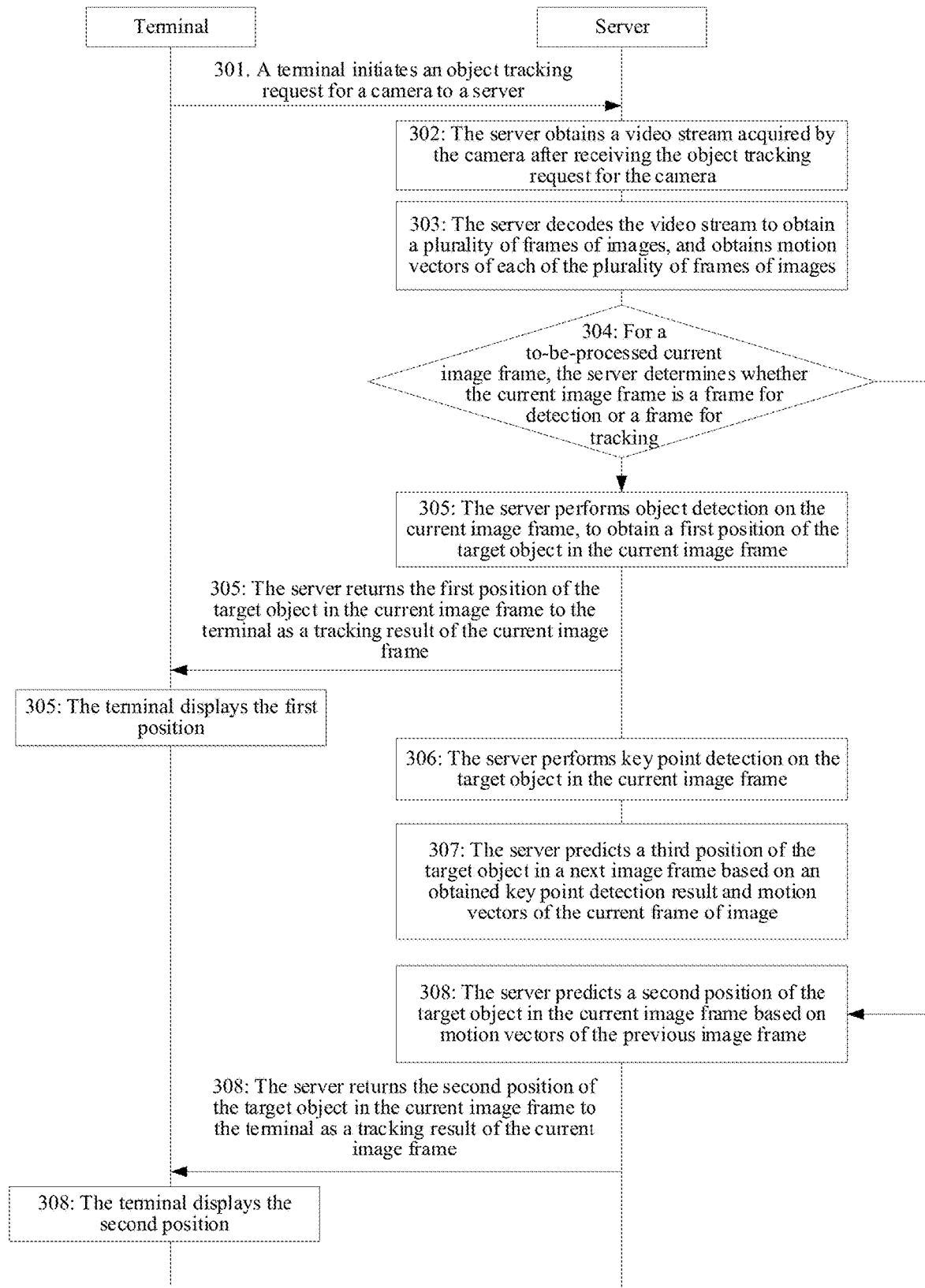
FIG. 3 is a flowchart of an object tracking method according to an embodiment of the present disclosure.

FIG. 3 is a flowchart of an object tracking method according to an embodiment of the present disclosure. Referring to FIG. 3, a method process provided in this embodiment of the present disclosure includes the following steps.

301. A terminal initiates an object tracking request for a camera to a server.

Using a single-camera multi-object tracking scenario as an example, the camera refers to a single camera. The camera may be a fixed camera or a mobile camera. This is not specifically limited in the embodiments of the present disclosure.

In an example, the terminal may initiate the object tracking request for any camera performing video surveillance in a surveillance range.

302: The server obtains a video stream acquired by the camera after receiving the object tracking request for the camera.

As shown in FIG. 2, after acquiring the video stream, the camera generally uploads the acquired video stream to the server for backup storage. Therefore, after receiving the object tracking request, the server may directly obtain, from a back-end database or the like, the video stream acquired by the corresponding camera.

Video data acquired by the camera is generally transmitted in the form of "stream".

303: The server decodes the video stream to obtain a plurality of image frames, and obtains motion vectors of each of the plurality of image frames.

In this embodiment of the present disclosure, the server decodes the video stream after obtaining the video stream. In other words, the server segments the video stream frame by frame, that is, divides the video stream into frames to obtain individual images frame by frame.

Motion vectors of an image frame include motion vectors of all pixels. The motion vectors indicate relative displacements of the pixels between two adjacent image frames.

In an example, for each image frame decoded from the video stream acquired by the camera, a motion vector of a pixel of which a coordinate position is (x, y) in the image frame is $(d_x, d_y)$.

In one embodiment, the motion vectors are directly extracted by the server, from the video stream acquired by the camera according to a bitstream format and decoding characteristics of the video stream. In other words, the motion vectors are information included in the video stream acquired by the camera.

304: for a to-be-processed current image frame, the server determines whether the current image frame is a frame for detection or a frame for tracking; performs the following step 305 in response to that the current image frame is a frame for detection; or performs the following step 308 in response to that the current image frame is a frame for tracking.

In this embodiment of the present disclosure, to use the decoded information of all the images and skip performing object detection on all the images, the server classified the decoded plurality of image frames into the frames for detection and the frames for tracking. The frame for detection refers to a video frame on which object detection needs to be performed, and the frame for tracking is a video frame on which object detection does not need to be performed, but a tracking operation needs to be performed. The frame for detection is also referred to as a first-type image, and the frame for tracking is also referred to as a second-type image.

The first decoded image frame is a frame for detection. That is, the first decoded image frame in the plurality of image frames is a frame for detection, and every two frames for detection are spaced by one or more frames for tracking. That is, one frame for detection may be generally followed by a plurality of frames for tracking. The densities of the frames for detection and the frame for tracking may be set according to a specific scenario. This is not specifically limited in the embodiments of the present disclosure.

In an example, as shown in FIG. 2, assuming that a specified interval of the frames for detection is five frames, if the $i^{th}$ frame is a frame for detection, the $(i+1)^{th}$ frame, the $(i+2)^{th}$ frame, the $(i+3)^{th}$ frame, and the $(i+4)^{th}$ frame are frames for tracking, and the $(i+5)^{th}$ frame is a frame for detection. A value of i is a positive integer. Using an example in which the value of i is set to 1, the second frame, the third frame, the fourth frame, and the fifth frame are frames for tracking, and the first frame and the sixth frame are frames for detection.

305: The server performs object detection on the current image frame, to obtain a first position of the target object in the current image frame, and returns the first position of the target object in the current image frame to the terminal as a tracking result of the current image frame, and the terminal displays the first position.

First, the object tracked by the server, that is, the target object, includes, but is not limited to, a human, a vehicle, an animal, and the like. This is not specifically limited in the embodiments of the present disclosure.

Second, there may be a plurality of target objects in an image frame. Exemplarily, when performing object detection, the server provides position information of all the target objects in the current image frame.

In this embodiment of the present disclosure, the server performs object detection on the current image frame based on an object detection algorithm. An object detection algorithm that is used includes, but is not limited to, a Faster R-CNN (convolutional neural network), a Mask R-CNN, you only look once (YOLO), YOLOv2, YOLOv3, and the like.

In one embodiment, using an example in which the target object is a pedestrian, an object detection result provides position information (xb, yb, width, height) of the pedestrian. The position information exactly corresponds to the foregoing first position. (xb, yb) is coordinates of a starting point of a bounding rectangle (which is also referred to as a bounding box) of the detected pedestrian, and width and the height refer to the width and the height of the bounding rectangle respectively.

Figure 4:
FIG. 4 is an effect diagram of object detection according to an embodiment of the present disclosure.

An effect of performing object detection by the server may be shown in FIG. 4.

In this embodiment of the present disclosure, the first position, that is, the position information (xb, yb, width, height), of the target object in the current image frame is returned to the terminal as the tracking result of the current image frame for a first terminal to display the tracking result on a front end to a user.

306: The server performs key point detection on the target object in the current image frame.

Exemplarily, using an example in which the target object is a pedestrian, the performing key point detection on the target object is to perform human skeleton key point detection on the pedestrian. That is, this step is performed for locating key points of a human body and providing coordinates (xk, yk) of the key points of the human body.

Figure 5:
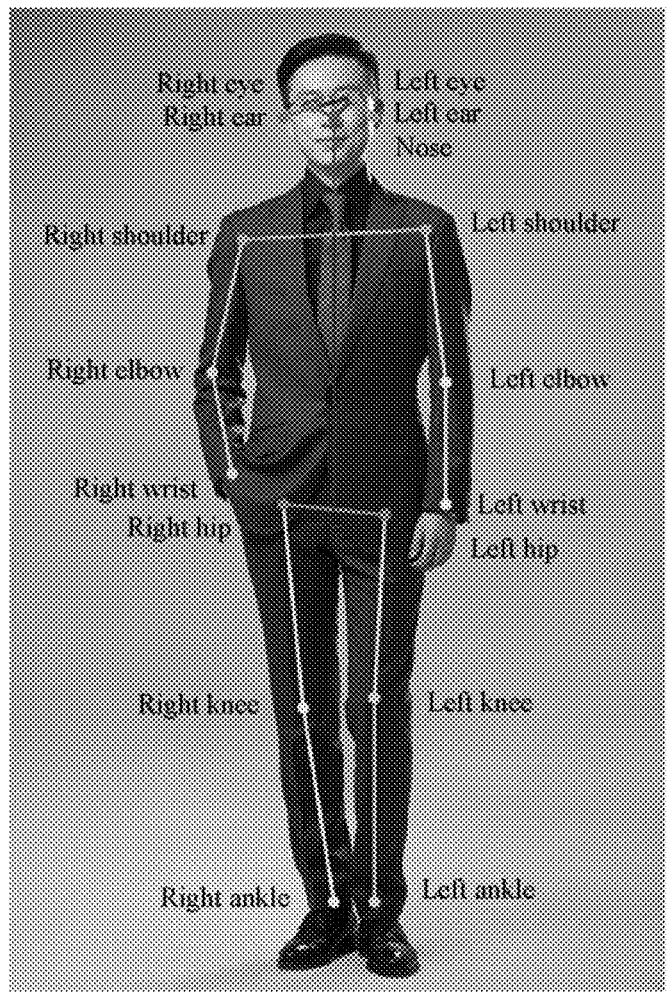
FIG. 5 is a schematic diagram of key points in human body key point detection according to an embodiment of the present disclosure.

In one embodiment, referring to FIG. 5, a human body includes 17 key points: the left eye, the right eye, the left ear, the right ear, the nose, the left shoulder, the right shoulder, the left elbow, the right elbow, the left wrist, the right wrist, the left hip, the right hip, the left knee, the right knee, the left ankle, and the right ankle.

In an example, when the server performs human skeleton key point detection, an algorithm used for the human skeleton key point detection includes, but is not limited to, G-RMI, a Mask R-CNN, a high-resolution network (HR-Net), a cascaded pyramid network (CPN), and the like. This is not specifically limited in the embodiments of the present disclosure.

Figure 6:
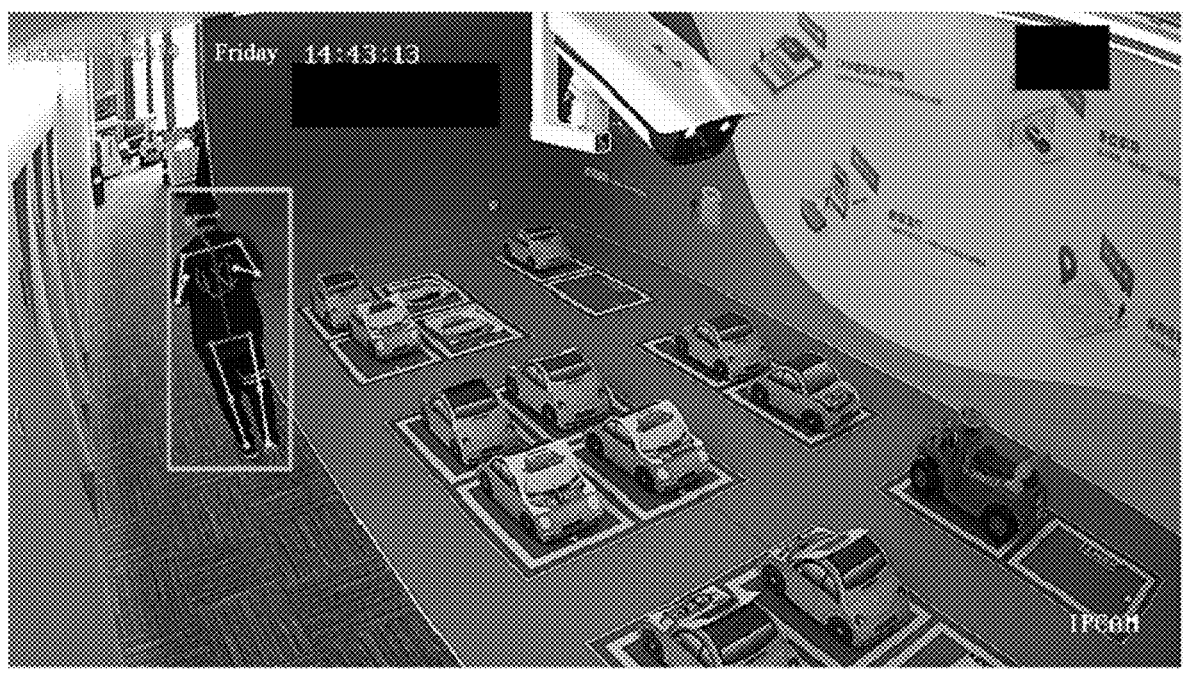
FIG. 6 is an effect diagram of human body key point detection according to an embodiment of the present disclosure.

An effect of performing human skeleton key point detection by the server may be shown in FIG. 6.

307: The server predicts a third position of the target object in the current image frame in a next image frame based on an obtained key point detection result and motion vectors of the current image frame.

In one embodiment, this step may be divided into the following several steps:

3071: Perform region division on each target object according to the key point detection result.

For this step, the following step is performed for each target object: dividing each target object into a plurality of regions based on the key point detection result of the each target object.

Using an example in which the target object is a pedestrian, each pedestrian is divided into a plurality of human body regions based on a result of human skeleton key point detection on the each pedestrian.

Figure 7:
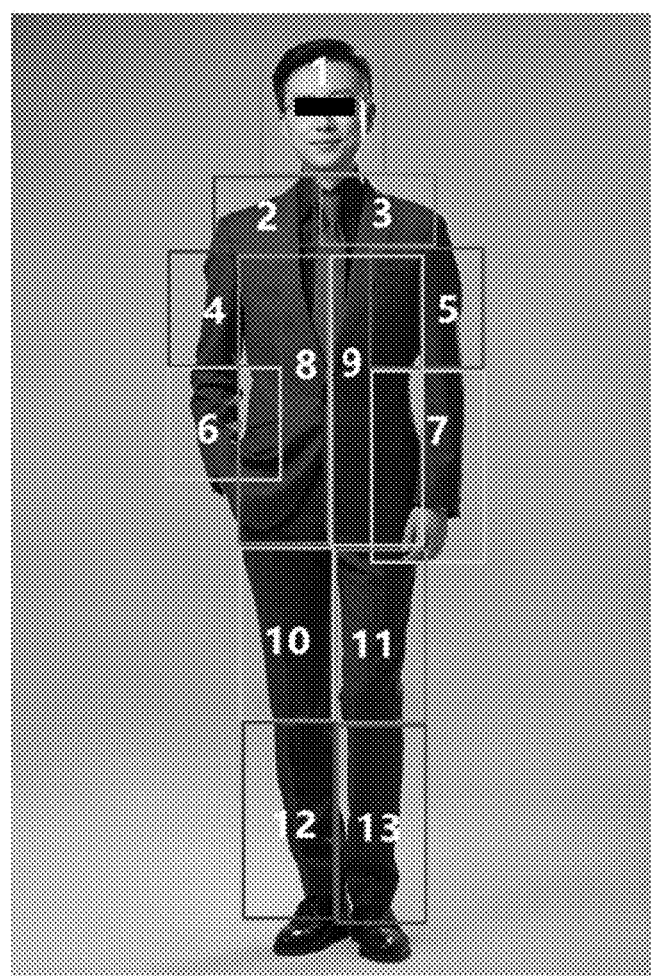
FIG. 7 is a schematic diagram of regions in human body region division according to an embodiment of the present disclosure.
Figure 8:
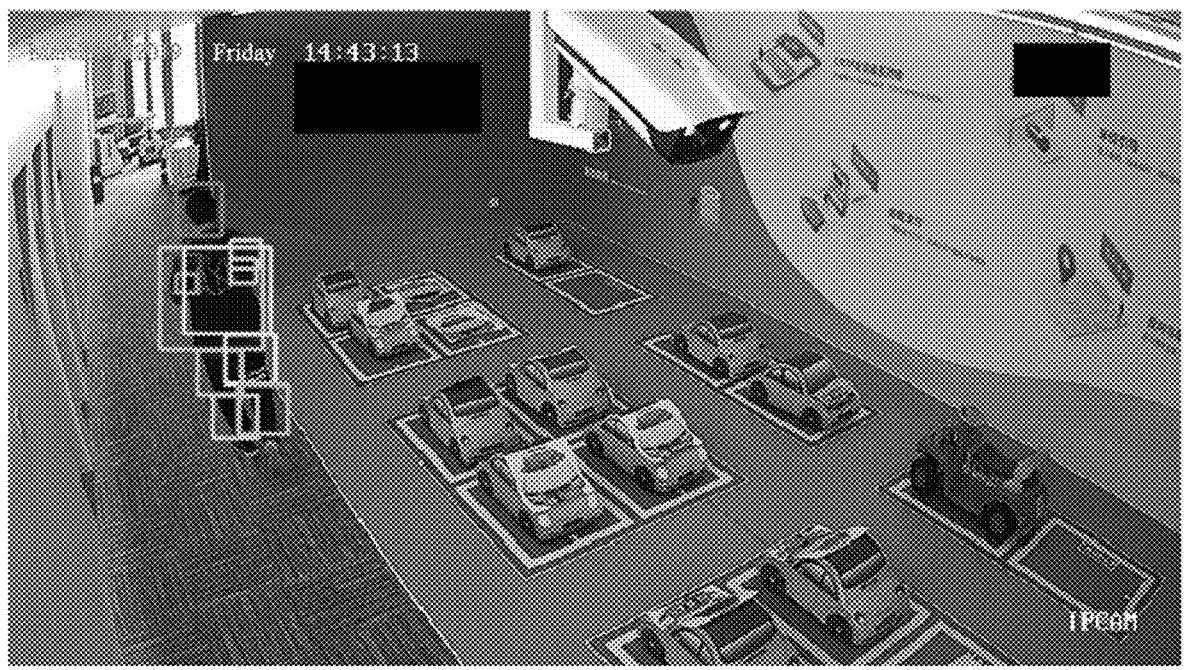
FIG. 8 is an effect diagram of performing human body region division according to an embodiment of the present disclosure.

In an example, as shown in FIG. 7, in this embodiment of the present disclosure, a human body is divided into 13 regions in total. The 13 regions are represented by numbers 1 to 13 respectively. As shown in FIG. 8, the 13 regions are very likely to overlap due to an angle of view of the camera and a posture change of the human body during movement.

3072: Obtain, for the each target object, motion vector biases of regions that are obtained through division.

In this step, the motion vector biases of the regions of the target object are respectively obtained according to the motion vectors. That is, the server obtains a motion vector bias of each region of the target object based on the motion vectors of the current image frame. The motion vector bias herein is an average motion vector bias, and the average motion vector bias is represented by coordinates $(d_{ave-x}, d_{ave-y})$.

In one embodiment, a calculation formula of the average motion vector bias is as follows:

$$d_{ave-x} = \frac{\sum_{i=1}^{N} d_x}{N}$$

$$d_{ave-y} = \frac{\sum_{k=1}^{N} d_y}{N}$$

where $(d_x, d_y)$ is a motion vector of a pixel of which coordinates are (x, y), and N is a total quantity of pixels included in the region. The calculation formula is described as follows: obtaining, for each region of the target object, motion vectors of pixels in the region based on the motion vectors of the current image frame; and obtaining an average motion vector bias of the region based on a total quantity of the pixels included in the region and the motion vectors of the pixels in the region.

3073: Translate the regions of the each target object based on the corresponding motion vector biases, to obtain region positions respectively corresponding to the regions in the next image frame.

Figure 9:
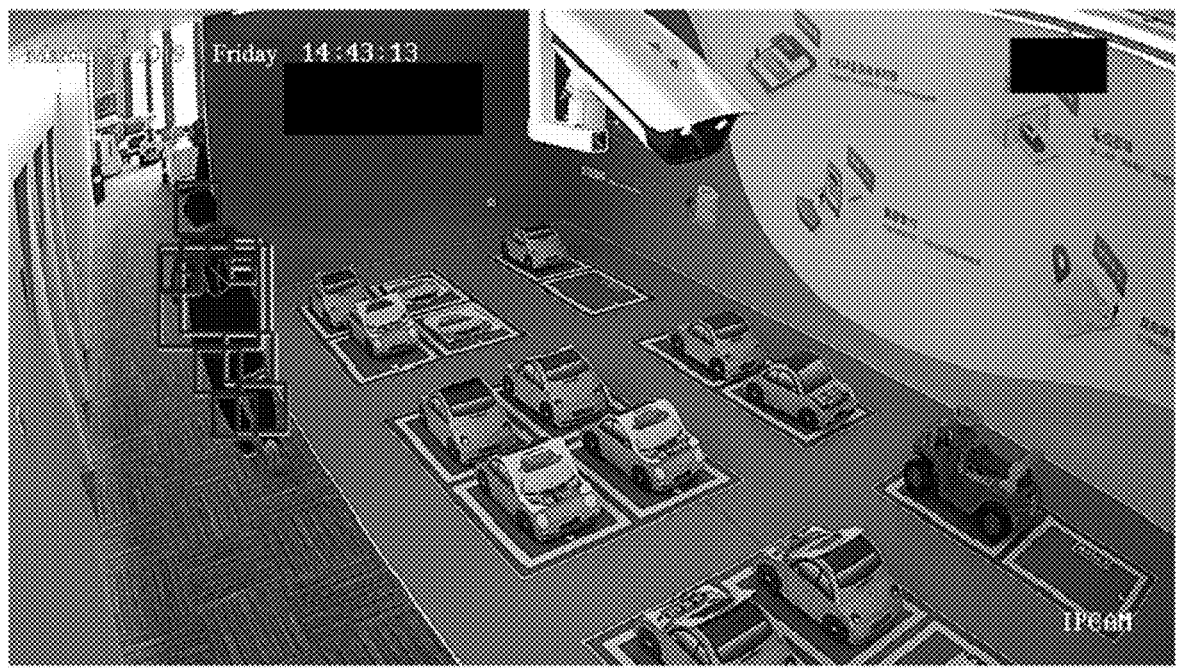
FIG. 9 is an effect diagram of estimated positions of regions of a target object in a next image frame according to an embodiment of the present disclosure.

As shown in FIG. 9, annotation boxes shown in FIG. 9 are specific positions of the regions in the next image frame that are estimated according to the motion vectors of the regions in the current image frame.

3074: Generate a bounding rectangle surrounding the regions in the next image frame based on the predicted positions of the regions in the next image frame, to obtain the third position of the target object in the next image frame.

For this step, the server obtains a bounding rectangle according to the predicted positions of the regions in the next image frame and uses the bounding rectangle as the position of the corresponding target object in the next image frame, so as to implement tracking of the target object in the next image frame without performing operations, such as object detection and key point detection, on the next image frame, thereby saving algorithm resources and improving the processing speed.

Figure 10:
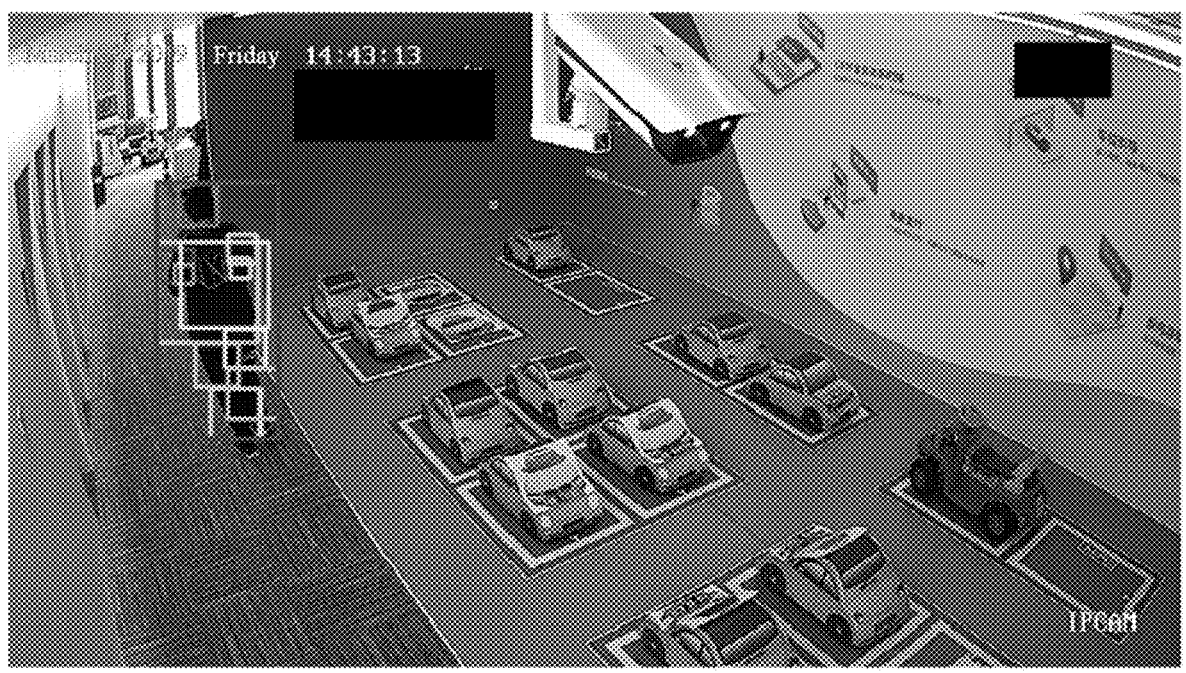
FIG. 10 is an effect diagram of an of determining a position of a target object in a next image frame according to an embodiment of the present disclosure.

A processing effect diagram of this step may be as shown in FIG. 10. So far, the processing of the current image frame is completed through step 305 to step 307.

Using an example in which the current image frame is the $i^{th}$ frame in FIG. 2, because the $i^{th}$ frame is a frame for detection, processing, such as object detection, key point detection, region division, obtaining of a motion vector bias of a region, and determining of a position of the object in the next image frame, needs to be performed on the $i^{th}$ frame in sequence. However, a next frame of the $i^{th}$ frame, that is, the $(i+1)^{th}$ frame, and the subsequent $(i+2)^{th}$ frame to $(i+4)^{th}$ frame do not need to be processed like the $i^{th}$ frame. As shown in FIG. 2, only processing, other than object detection and key point detection, needs to be performed on the $(i+1)^{th}$ frame to $(i+4)^{th}$ frame.

308: The server predicts a second position of the target object in the current image frame based on motion vectors of a previous image frame and a position of the target object in the previous image frame, and returns the second position of the target object in the current image frame to the terminal as a tracking result of the current image frame. The terminal displays the second position.

In this embodiment of the present disclosure, because the current image frame is a frame for tracking, in a process of processing the previous image frame, positions of the regions of the target object in the current image frame are estimated based on the motion vectors of the previous image frame, and a bounding rectangle is obtained, based on the estimated positions of the regions, as the position of the target object in the current image frame. That is, the second position the target object in the current image frame is obtained.

In other words, for an image frame, in response to that a next image frame of the image frame is not a frame for detection, positions of the regions of the target object in the next image frame are estimated based on motion vectors of the image frame, and a position of the target object in the next image frame is determined based on the estimated positions of the regions.

In another embodiment, in response to that the next image frame of the current image frame is still a frame for tracking, a fourth position of the target object in the current image frame in the next image frame is predicted based on the motion vectors of the current image frame in this embodiment of the present disclosure.

In one embodiment, that a fourth position of the target object in the current image frame in the next image frame is predicted based on the motion vectors of the current image frame includes the following steps.

3081: Obtain motion vector biases of the regions of the target object based on the motion vectors of the current image frame.

This step is similar to the foregoing step 3072.

In addition, because the current image frame is a frame for tracking, the positions of the regions of the target object in the current image frame are obtained through estimation on the previous image frame.

3082: Translate the regions based on the motion vector biases of the regions, to obtain positions of the regions in the next image frame.

This step is similar to the foregoing step 3073.

3083: Generate a bounding box surrounding the regions in the next image frame based on the predicted positions of the regions in the next image frame, to obtain the fourth position of the target object in the next image frame.

This step is similar to the foregoing step 3074.

The method provided by this embodiment of the present disclosure has the following beneficial effects:

After the video stream acquired by the camera is obtained, the video stream is first decoded to obtain a plurality of image frames. Next, the following processing is sequentially performed on the decoded plurality of image frames: determining, for the to-be-detected current image frame, the current image frame is the frame for detection or the frame for tracking; performing object detection on the current image frame in response to that the current image frame is the frame for detection, to obtain position information of the target object in the current image frame; and predicting, based on the motion vectors of the previous image frame and position of the target object in the previous image frame in response to that the current image frame is the frame for tracking, position information of the target object in the current image frame.

Based on the above, it can be learned that, in this embodiment of the present disclosure, the decoded plurality of image frames are classified into frames for detection and frames for tracking. Object detection is performed on the frames for detection. Motion detection is performed on the frames for tracking based on motion vectors. That is, spatial motion information of a tracked object is obtained by using motion vectors.

The object tracking method provided in the embodiments of the present disclosure not only utilizes decoded information of all the images, but also avoids the problem of relatively slow detection caused by object detection on the images frame by frame, which not only ensures the real-time tracking speed, but also ensures the accuracy of an obtained tracking result, thereby greatly improving the object tracking efficiency, and reducing consumption of time and resources.

In addition, a movement trajectory of each target object can be obtained by connecting position information of the target object in the image frames.

In addition, in the method provided in this embodiment of the present disclosure, motion vectors are used for object tracking, which effectively reduces the feature search space and further improves the object tracking efficiency.

In addition, the object tracking method provided in the embodiments of the present disclosure can implement single-camera multi-object tracking, and is further applicable to various service scenarios such as multi-camera multi-object tracking, loitering detection, and regional control.

In addition, the object tracking method provided in the embodiments of the present disclosure may be widely applied to the field of security, to reduce security costs and improve security efficiency.

Figure 11:
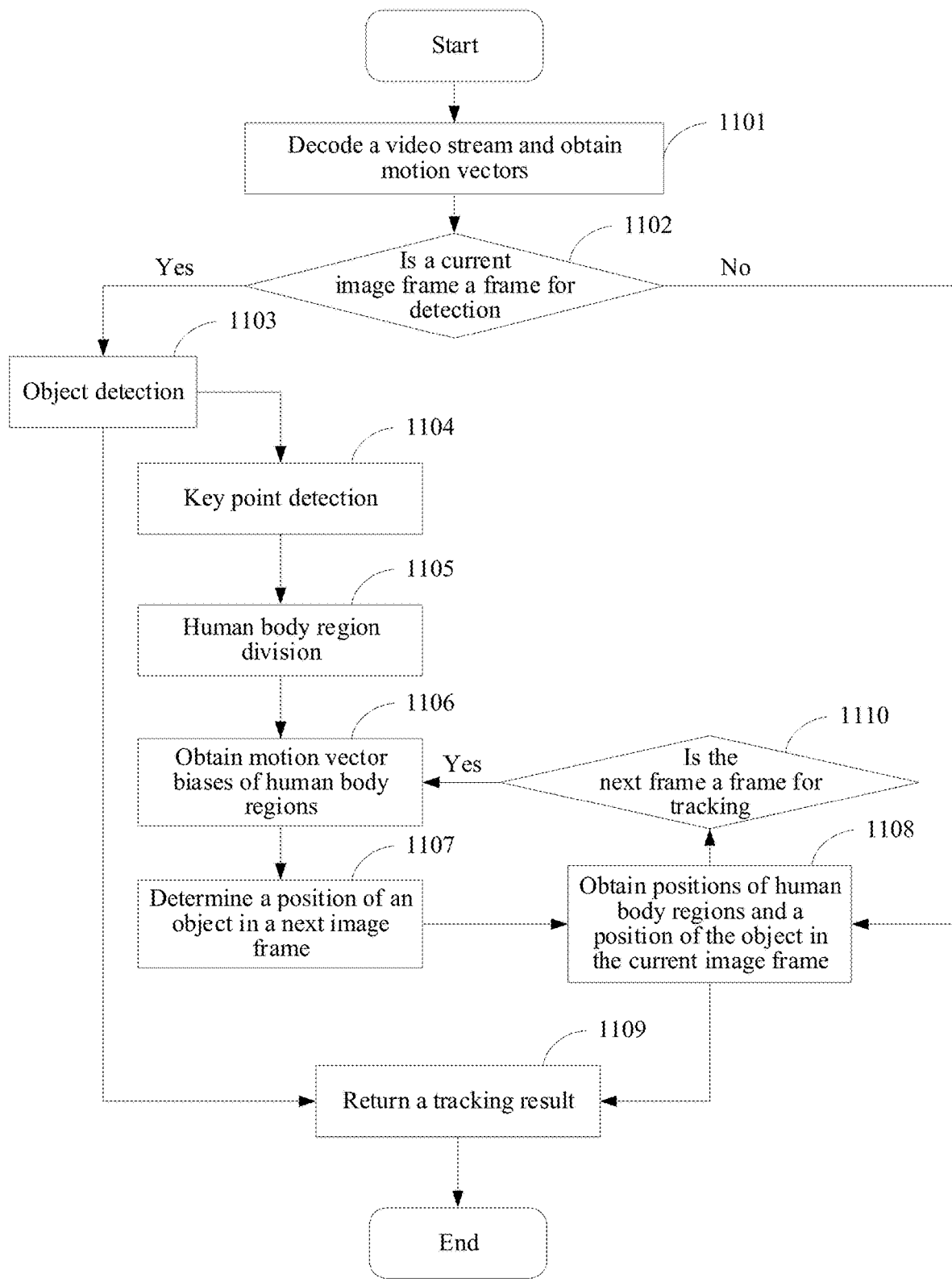
FIG. 11 is an overall execution flowchart of an object tracking method according to an embodiment of the present disclosure.

In another embodiment, referring to FIG. 11, using an example in which an object is a pedestrian, an entire execution flowchart of an object tracking method provided in this embodiment of the present disclosure includes the following steps.

1101: Decode a video stream acquired by a camera, and obtain motion vectors of each decoded image frame.

In this step, the video stream is decoded into image frames, and the motion vectors of each image frame are extracted.

1102: Determine whether a current image frame is a frame for detection or a frame for tracking; perform the following step 1103 in response to that the current image frame is a frame for detection; or perform the following step 1108 in response to that the current image frame is a frame for tracking.

The first decoded image frame still needs to be a frame for detection. One frame for detection may be generally followed by a plurality of frames for tracking. The densities of the frames for detection and the frame for tracking may be set according to a specific scenario. This is not specifically limited in the embodiments of the present disclosure.

1103: Detect a human body object in the current image frame based on an object detection algorithm, use position information (xb, yb, width, height) of the detected human body object as a tracking result of the current image frame, and perform the following step 1109.

1104: Perform human skeleton key point detection on each detected human body object based on a human skeleton key point detection algorithm.

1105: Perform human body region division on the each human body object according to corresponding human body key point information.

1106: Obtain motion vector biases of human body regions of the each human body object based on motion vectors of the each human body object in the current image frame, and translate the human body regions according to the corresponding motion vector biases, to obtain positions respectively corresponding to the human body regions in a next image frame.

1107: Determine a position of the each human body object in the next image frame according to the positions that correspond to the human body regions in the next image frame and that are predicted in the previous step. So far, processing on the frame is completed.

1108: Obtain, based on step 1106 and step 1107, position information of the human body regions of the each human body object in the current image frame serving as a frame for tracking, and position information of the each human body object in the current image frame, use the obtained position information of the each human body object as the tracking result of the current image frame, and separately perform the following step 1109 and step 1110.

1109: Return the tracking result of the current frame.

There may be a plurality of human body objects in an image frame. Exemplarily, position information of all detected human body objects is returned.

1110: Determine whether the next image frame is a frame for tracking, and jump to step 1106 in response to that the next image frame is a frame for tracking.

In the method provided in this embodiment of the present disclosure, after the video stream acquired by the camera is obtained, the video stream is first decoded to obtain a plurality of image frames. Next, the following processing is sequentially performed on the decoded plurality of image frames: determining, for the to-be-detected current image frame, the current image frame is the frame for detection or the frame for tracking; performing object detection on the current image frame in response to that the current image frame is the frame for detection, to obtain the position of the target object in the current image frame; and predicting a position of the target object in the current image frame based on the motion vectors of the previous image frame and position of the target object in the previous image frame in response to that the current image frame is the frame for tracking.

Based on the above, it can be learned that, in this embodiment of the present disclosure, the decoded plurality of image frames are classified into frames for detection and frames for tracking. Object detection is performed on the frames for detection. Motion detection is merely performed on the frames for tracking based on motion vectors. That is, spatial motion information of a tracked object is obtained by using motion vectors.

The object tracking method provided in the embodiments of the present disclosure not only utilizes decoded information of all the images, but also avoids the problem of relatively slow detection caused by object detection on the images frame by frame, which not only ensures the real-time tracking speed, but also ensures the accuracy of an obtained tracking result, thereby greatly improving the object tracking efficiency, and reducing consumption of time and resources.

In addition, a movement trajectory of each target object can be obtained by connecting position information of the target object in the image frames.

In addition, in the method provided in this embodiment of the present disclosure, motion vectors are used for object tracking, which effectively reduces the feature search space and further improves the object tracking efficiency.

In addition, the object tracking method provided in the embodiments of the present disclosure can implement single-camera multi-object tracking, and is further applicable to various service scenarios such as multi-camera multi-object tracking, loitering detection, and regional control.

In addition, the object tracking method provided in the embodiments of the present disclosure may be widely applied to the field of security, to reduce security costs and improve security efficiency.

Figure 12:
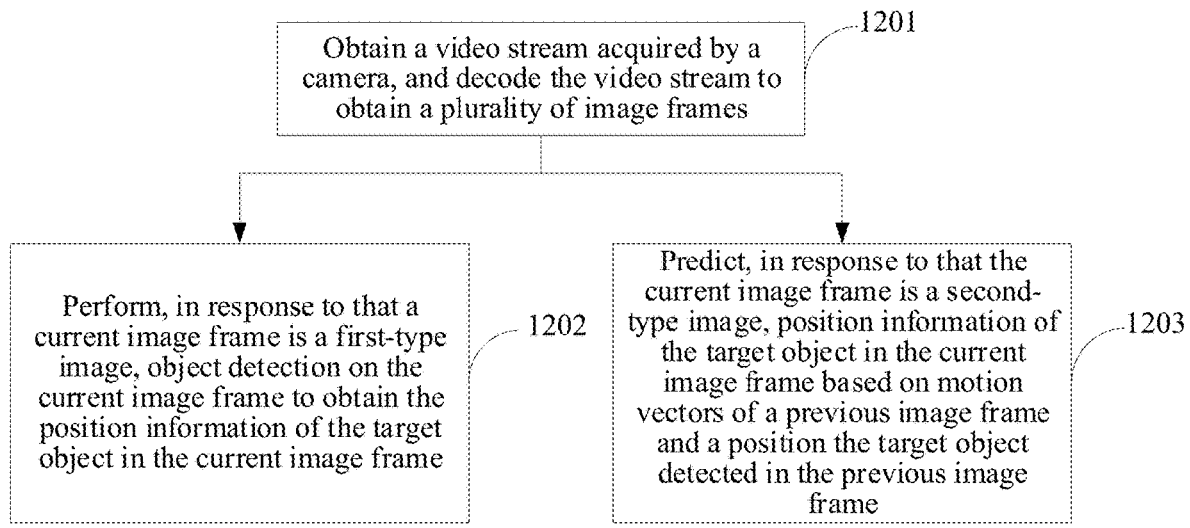
FIG. 12 is a flowchart of an object tracking method according to an embodiment of the present disclosure.

In another embodiment, referring to FIG. 12, an object tracking method provided in this embodiment of the present disclosure includes the following steps:

1201: Obtain a video stream acquired by a camera, and decode the video stream to obtain a plurality of image frames.

1202: Perform, in response to that a current image frame is a first-type image, object detection on the current image frame to obtain the position information of the target object in the current image frame.

1203: Predict, in response to that the current image frame is a second-type image, position information of the target object in the current image frame based on motion vectors of a previous image frame and a position the target object in the previous image frame.

In the method provided in this embodiment of the present disclosure, after the video stream acquired by the camera is obtained, the video stream is first decoded to obtain a plurality of image frames. Next, the following processing is sequentially performed on the decoded plurality of image frames: performing, for the to-be-detected current image frame, object detection on the current image frame in response to that the current image frame is the first-type image, to obtain the position of the target object in the current image frame; and predicting the position of the target object in the current image frame based on the motion vectors of the previous image frame and position the target object in the previous image frame in response to that the current image frame is the second-type image.

Based on the above, it can be learned that, in this embodiment of the present disclosure, the decoded plurality of image frames are classified into the first-type images and the second-type images. Object detection is performed on the first-type image. Motion detection is merely performed on the second-type image based on motion vectors. That is, spatial motion information of a tracked object is obtained by using motion vectors.

The object tracking method provided in the embodiments of the present disclosure not only utilizes decoded information of all the images, but also avoids the problem of relatively slow detection caused by object detection on the images frame by frame, which not only ensures the real-time tracking speed, but also ensures the accuracy of an obtained tracking result, thereby greatly improving the object tracking efficiency, and reducing consumption of time and resources.

In addition, in the method provided in this embodiment of the present disclosure, motion vectors are used for object tracking, which effectively reduces the feature search space and further improves the object tracking efficiency.

Figure 13:
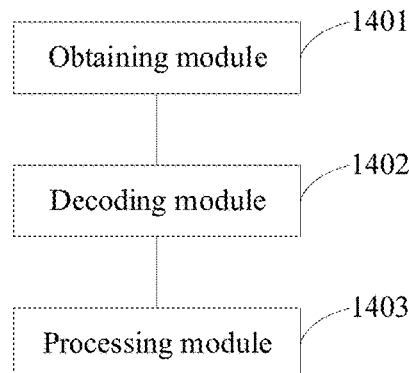
FIG. 13 is a schematic structural diagram of an object tracking apparatus according to an embodiment of the present disclosure.

FIG. 13 is a schematic structural diagram of an object tracking apparatus according to an embodiment of the present disclosure. Referring to FIG. 13, the apparatus includes:

an obtaining module 1301, configured to obtain a video stream acquired by a camera;

a decoding module 1302, configured to decode the video stream to obtain a plurality of image frames; and a processing module 1303, configured to: for a to-be-processed current image frame, perform object detection on the current image frame in response to that the current image frame is a first-type image, to obtain position information of a target object in the current image frame; or predict, in response to that the current image frame is a second-type image, position information of a target object in the current image frame based on motion vectors of the previous image frame and position the target object in the previous image frame.

In the apparatus provided in this embodiment of the present disclosure, after the video stream acquired by the camera is obtained, the video stream is first decoded to obtain a plurality of image frames. Next, the following processing is sequentially performed on the decoded plurality of image frames: determining, for the to-be-detected current image frame, whether the current image frame is the first-type image or the second-type image; performing object detection on the current image frame in response to that the current image frame is the first-type image, to obtain the position information of the target object in the current image frame; and predicting position information of the target object in the current image frame based on the motion vectors of the previous image frame and position the target object in the previous image frame in response to that the current image frame is the second-type image. Based on the above, it can be learned that, in this embodiment of the present disclosure, the decoded plurality of image frames are classified into two types. Object detection is performed on the first-type image. Motion detection is performed on the second-type image based on motion vectors. That is, spatial motion information of a tracked object is obtained by using motion vectors. The object tracking method not only utilizes decoded information of all the images, but also avoids the problem of relatively slow detection caused by object detection on the images frame by frame, which not only ensures the real-time tracking speed, but also ensures the accuracy of an obtained tracking result, thereby greatly improving the object tracking efficiency, and reducing consumption of time and resources.

In one embodiment, the first-type image is a frame for detection in the plurality of image frames, and the second-type image is a frame for tracking in the plurality of image frames.

The first decoded image frame in the plurality of image frames is the frame for detection, and every two frames for detection are spaced by one or more frames for tracking.

In one embodiment, in response to that the current image frame is the first-type image, the processing module is further configured to perform key point detection on the target object in the current image frame after the object detection is performed on the current image frame; and predict next position information of the target object in a next image frame based on an obtained key point detection result and motion vectors of the current image frame.

In one embodiment, there are one or more target objects in the current image frame, and the processing module is further configured to, for each target object, divide the each target object into a plurality of regions based on a key point detection result of the each target object; obtain motion vector biases of the regions of the target object based on the motion vectors of the current image frame; and predict next position information of the target object in the next image frame based on the motion vector biases of the regions.

In one embodiment, in response to that the current image frame is a second-type image, the processing module is further configured to predict next position information of the target object in the next image frame based on motion vectors of the current image frame in response to that the next image frame is the frame for tracking.

In one embodiment, the processing module is further configured to obtain motion vector biases of the regions of the target object based on the motion vectors of the current image frame; and predict next position information of the target object in the next image frame based on the motion vector biases of the regions.

In one embodiment, the processing module is further configured to obtain, for each region of the target object, motion vectors of pixels in the region based on the motion vectors of the current image frame; and obtain a motion vector bias of the region based on a total quantity of the pixels included in the region and the motion vectors of the pixels in the region.

In one embodiment, the processing module is further configured to translate the regions based on the motion vector biases of the regions, to obtain position information of the regions in the next image frame; and generate a bounding box surrounding the regions in the next image frame based on the predicted position information of the regions in the next image frame, to obtain the next position information of the target object in the next image frame.

In one embodiment, the processing module is further configured to obtain the video stream acquired by the camera after an object tracking request for the camera transmitted by a terminal is received.

In one embodiment, the apparatus further includes:

a transmitting module, configured to transmit the position information of the target object in the current image frame to the terminal, the terminal displaying the position information of the target object in the current image frame.

In one embodiment, in response to that the target object is a pedestrian, the processing module is further configured to perform human skeleton key point detection on the pedestrian in the current image frame; and divide the pedestrian into a plurality of human body regions based on a result of the human skeleton key point detection on the pedestrian.

Any combination of the foregoing technical solutions may be used to form an embodiment of the present disclosure. Details are not described herein again.

When the object tracking apparatus provided in the foregoing embodiments tracks an object, only division of the foregoing function modules is used as an example for description. In the practical application, the functions may be allocated to and completed by different functional modules according to requirements. That is, an internal structure of the apparatus is divided into different functional modules, to complete all or some of the functions described above. In addition, the embodiment of the object tracking apparatus and the embodiment of the object tracking method provided in the foregoing embodiments belong to one conception. For the specific implementation process, reference may be made to the method embodiments, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
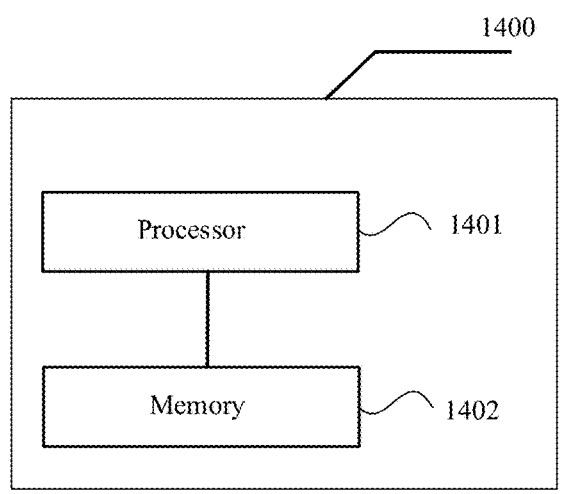
FIG. 14 is a schematic structural diagram of an electronic device according to an embodiment of the present disclosure.

FIG. 14 is a schematic structural diagram of an electronic device according to an embodiment of the present disclosure. The electronic device may be represented by a server. The electronic device 1400 may vary greatly due to different configurations or different performance, and may include one or more central processing units (CPUs) 1401 and one or more memories 1402. Certainly, the server may also have a wired or wireless network interface, a keyboard, an input/output interface and other components to facilitate input/output. The server may also include other components for implementing device functions. Details are not described herein again.

The memory 1402 stores at least one instruction, the at least one instruction being loaded and executed by the processor 1401 to implement the following steps:

obtaining a video stream acquired by a camera, and decoding the video stream to obtain a plurality of image frames; and for a to-be-processed current image frame, performing object detection on the current image frame in response to that the current image frame is a first-type image, to obtain position information of a target object in the current image frame; or predicting, in response to that the current image frame is a second-type image, position information of a target object in the current image frame based on motion vectors of the previous image frame and position the target object in the previous image frame.

In one embodiment, the first-type image is a frame for detection in the plurality of image frames, and the second-type image is a frame for tracking in the plurality of image frames.

The first decoded image frame in the plurality of image frames is the frame for detection, and every two frames for detection are spaced by one or more frames for tracking.

In one embodiment, in response to that the current image frame is the first-type image, the at least one instruction is loaded and executed by the processor to implement the following steps:

performing key point detection on the target object in the current image frame after the object detection is performed on the current image frame; and predicting next position information of the target object in a next image frame based on an obtained key point detection result and motion vectors of the current image frame.

In one embodiment, there are one or more target objects in the current image frame.

The at least one instruction is loaded and executed by the processor to implement the following steps:

for each target object, dividing the each target object into a plurality of regions based on a key point detection result of the each target object;

obtaining motion vector biases of the regions of the target object based on the motion vectors of the current image frame; and predicting next position information of the target object in the next image frame based on the motion vector biases of the regions.

In one embodiment, in response to that the current image frame is a second-type image, the at least one instruction is loaded and executed by the processor to implement the following step:

predicting, in response to that a next image frame is the frame for tracking, next position information of the target object in the next image frame based on motion vectors of the current image frame.

In one embodiment, the at least one instruction is loaded and executed by the processor to implement the following steps:

obtaining motion vector biases of the regions of the target object based on the motion vectors of the current image frame; and predicting next position information of the target object in the next image frame based on the motion vector biases of the regions.

In one embodiment, the at least one instruction is loaded and executed by the processor to implement the following steps:

obtaining, for each region of the target object, motion vectors of pixels in the region based on the motion vectors of the current image frame; and obtaining a motion vector bias of the region based on a total quantity of the pixels included in the region and the motion vectors of the pixels in the region.

In one embodiment, the at least one instruction is loaded and executed by the processor to implement the following steps:

translating the regions based on the motion vector biases of the regions, to obtain position information of the regions in the next image frame; and generating a bounding box surrounding the regions in the next image frame based on the predicted position information of the regions in the next image frame, to obtain the next position information of the target object in the next image frame.

In one embodiment, the at least one instruction is loaded and executed by the processor to implement the following step:

obtaining the video stream acquired by the camera after an object tracking request transmitted by a terminal for the camera is received.

In one embodiment, the at least one instruction is loaded and executed by the processor to implement the following step:

transmitting the position information of the target object in the current image frame to the terminal, the terminal displaying the position information of the target object in the current image frame.

In one embodiment, in response to that the target object is a pedestrian, the at least one instruction is loaded and executed by the processor to implement the following step:

performing human skeleton key point detection on the pedestrian in the current image frame.

The dividing the each target object into a plurality of regions based on a key point detection result of the each target object includes:

dividing the pedestrian into a plurality of human body regions based on a result of the human skeleton key point detection on the pedestrian.

In an exemplary embodiment, a computer-readable storage medium, for example, a memory including instructions, is further provided. The instructions may be loaded and executed by the processor in the electronic device 1400 to implement the following steps:

obtaining a video stream acquired by a camera, and decoding the video stream to obtain a plurality of image frames; and for a to-be-processed current image frame, performing object detection on the current image frame in response to that the current image frame is a first-type image, to obtain position information of a target object in the current image frame; or predicting, in response to that the current image frame is a second-type image, position information of a target object in the current image frame based on motion vectors of the previous image frame and position the target object in the previous image frame.

In one embodiment, the first-type image is a frame for detection in the plurality of image frames, and the second-type image is a frame for tracking in the plurality of image frames.

The first decoded image frame in the plurality of image frames is the frame for detection, and every two frames for detection are spaced by one or more frames for tracking.

In one embodiment, in response to that the current image frame is the first-type image, the at least one instruction is loaded and executed by the processor to implement the following steps:

performing key point detection on the target object in the current image frame after the object detection is performed on the current image frame; and predicting next position information of the target object in a next image frame based on an obtained key point detection result and motion vectors of the current image frame.

In one embodiment, there are one or more target objects in the current image frame.

The at least one instruction is loaded and executed by the processor to implement the following steps:

for each target object, dividing the each target object into a plurality of regions based on a key point detection result of the each target object;

obtaining motion vector biases of the regions of the target object based on the motion vectors of the current image frame; and predicting next position information of the target object in the next image frame based on the motion vector biases of the regions.

In one embodiment, in response to that the current image frame is a second-type image, the instruction is loaded and executed by the processor to implement the following step:

predicting, in response to that a next image frame is the frame for tracking, next position information of the target object in the next image frame based on motion vectors of the current image frame.

In one embodiment, the instruction is loaded and executed by the processor to implement the following steps:

obtaining motion vector biases of the regions of the target object based on the motion vectors of the current image frame; and predicting next position information of the target object in the next image frame based on the motion vector biases of the regions.

In one embodiment, the instruction is loaded and executed by the processor to implement the following steps:

obtaining, for each region of the target object, motion vectors of pixels in the region based on the motion vectors of the current image frame; and obtaining a motion vector bias of the region based on a total quantity of the pixels included in the region and the motion vectors of the pixels in the region.

In one embodiment, the instruction is loaded and executed by the processor to implement the following steps:

translating the regions based on the motion vector biases of the regions, to obtain position information of the regions in the next image frame; and generating a bounding box surrounding the regions in the next image frame based on the predicted position information of the regions in the next image frame, to obtain the next position information of the target object in the next image frame.

In one embodiment, the instruction is loaded and executed by the processor to implement the following step:

obtaining the video stream acquired by the camera after an object tracking request transmitted by a terminal for the camera is received.

In one embodiment, the instruction is loaded and executed by the processor to implement the following step:

transmitting the position information of the target object in the current image frame to the terminal, the terminal displaying the position information of the target object in the current image frame.

In one embodiment, in response to that the target object is a pedestrian, the instruction is loaded and executed by the processor to implement the following step:

performing human skeleton key point detection on the pedestrian in the current image frame.

The dividing the each target object into a plurality of regions based on a key point detection result of the each target object includes:

dividing the pedestrian into a plurality of human body regions based on a result of the human skeleton key point detection on the pedestrian.

For example, the computer-readable storage medium may be a read-only memory (ROM), a random access memory (RAM), a compact disc read-only memory (CD-ROM), a magnetic tape, a floppy disk, an optical data storage device, and the like.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of the present disclosure, and are not intended to limit the present disclosure. Any modification, equivalent replacement, improvement, and the like made within the spirit and principle of the present disclosure shall fall within the protection scope of the present disclosure.

What is claimed is:

1. An object tracking method, applied to an electronic device, the method comprising:
   obtaining a video stream acquired by a camera, and decoding the video stream to obtain a plurality of image frames;
   classifying the plurality of image frames into one or more first-type images and one or more second-type images;
   in response to determining that a current image frame is one of the one or more first-type images:
     performing object detection on the current image frame to obtain the position information of a target object in the current image frame;
     performing key point detection on the target object in the current image frame after the object detection is performed on the current image frame; and
     predicting next position information of the target object in a next image frame based on an obtained key point detection result and motion vectors of the current image frame; and
   in response to determining that a current image frame is one of the one or more second-type images:
     obtaining motion vectors of a previous image frame and position information of a target object in the previous image frame;
     predicting the position information of the target object in the current image frame based on the motion vectors of the previous image frame and the position information of the target object in the previous image frame; and
     predicting, in response to that a next image frame is a frame for tracking, next position information of the target object in the next image frame based on motion vectors of the current image frame.

2. The method according to claim 1, wherein each of the one or more first-type images is a frame for detection in the plurality of image frames, and each of the one or more second-type images is a frame for tracking in the plurality of image frames; and
   the first decoded image frame in the plurality of image frames is the frame for detection, and every two frames for detection are spaced by one or more frames for tracking.

3. The method according to claim 1, wherein the target object in the current image frame obtained from the object detection includes one or more target objects, and the predicting the next position information of the target object in the next image frame based on the obtained key point detection result and the motion vectors of the current image frame comprises:
   for each target object of the one or more target objects, dividing the each target object into a plurality of regions based on a key point detection result of the each target object;
   obtaining motion vector biases of the regions of the each target object based on the motion vectors of the current image frame; and
   predicting next position information of the each target object in the next image frame based on the motion vector biases of the regions.

4. The method according to claim 3, wherein the obtaining motion vector biases of the regions of the each target object based on the motion vectors of the current image frame comprises:
   obtaining, for each region of the each target object, motion vectors of pixels in the region based on the motion vectors of the current image frame; and
   obtaining a motion vector bias of the region based on a total quantity of the pixels comprised in the region and the motion vectors of the pixels in the region.

5. The method according to claim 3, wherein the predicting next position information of the each target object in the next image frame based on the motion vector biases of the regions comprises:
   translating the regions based on the motion vector biases of the regions, to obtain position information of the regions in the next image frame; and
   generating a bounding box surrounding the regions in the next image frame based on the predicted position information of the regions in the next image frame, to obtain the next position information of the each target object in the next image frame.

6. The method according to claim 3, wherein in response to that the target object is a pedestrian, the performing key point detection on the target object in the current image frame comprises:
   performing human skeleton key point detection on the pedestrian in the current image frame; and
   the dividing the each target object into a plurality of regions based on a key point detection result of the each target object comprises:
   dividing the pedestrian into a plurality of human body regions based on a result of the human skeleton key point detection on the pedestrian.

7. The method according to claim 1, wherein the predicting, in response to that the next image frame is the frame for tracking, the next position information of the target object in the next image frame based on the motion vectors of the current image frame comprises:
obtaining motion vector biases of the regions of the target object based on the motion vectors of the current image frame; and
predicting next position information of the target object in the next image frame based on the motion vector biases of the regions.

8. The method according to claim 1, wherein the obtaining the video stream acquired by the camera comprises:
obtaining the video stream acquired by the camera after an object tracking request transmitted by a terminal for the camera is received.

9. The method according to claim 8, further comprising:
transmitting the position information of the target object in the current image frame to the terminal, the terminal displaying the position information of the target object in the current image frame.

10. A non-transitory computer readable storage medium, storing at least one instruction, the at least one instruction being loaded and executed by at least one processor to implement:
obtaining a video stream acquired by a camera, and decoding the video stream to obtain a plurality of image frames;
classifying the plurality of image frames into one or more first-type images and one or more second-type images;
in response to determining that a current image frame is one of the one or more first-type images:
performing object detection on the current image frame to obtain the position information of a target object in the current image frame;
performing key point detection on the target object in the current image frame after the object detection is performed on the current image frame; and
predicting next position information of the target object in a next image frame based on an obtained key point detection result and motion vectors of the current image frame; and
in response to determining that a current image frame is one of the one or more second-type images:
obtaining motion vectors of a previous image frame and position information of a target object in the previous image frame;
predicting the position information of the target object in the current image frame based on the motion vectors of the previous image frame and the position information of the target object in the previous image frame; and
predicting, in response to that a next image frame is a frame for tracking, next position information of the target object in the next image frame based on motion vectors of the current image frame.

11. An electronic device, comprising at least one processor and at least one memory, the at least one memory storing at least one instruction, the at least one instruction being loaded and executed by the at least one processor to implement:
obtaining a video stream acquired by a camera, and decoding the video stream to obtain a plurality of image frames;
classifying the plurality of image frames into one or more first-type images and one or more second-type images;
in response to determining that a current image frame is one of the one or more first-type images:
performing object detection on the current image frame to obtain the position information of a target object in the current image frame;
performing key point detection on the target object in the current image frame after the object detection is performed on the current image frame; and
predicting next position information of the target object in a next image frame based on an obtained key point detection result and motion vectors of the current image frame; and
in response to determining that a current image frame is one of the one or more second-type images:
obtaining motion vectors of a previous image frame and position information of a target object in the previous image frame;
predicting the position information of the target object in the current image frame based on the motion vectors of the previous image frame and the position information of the target object in the previous image frame; and
predicting, in response to that a next image frame is a frame for tracking, next position information of the target object in the next image frame based on motion vectors of the current image frame.

12. The device according to claim 11, wherein each of the one or more first-type images is a frame for detection in the plurality of image frames, and each of the one or more second-type images is a frame for tracking in the plurality of image frames; and
the first decoded image frame in the plurality of image frames is the frame for detection, and every two frames for detection are spaced by one or more frames for tracking.

13. The device according to claim 11, wherein the target object in the current image frame obtained from the object detection includes one or more target objects, and
the at least one instruction is loaded and executed by the at least one processor to implement:
for each target object of the one or more target objects, dividing the each target object into a plurality of regions based on a key point detection result of the each target object;
obtaining motion vector biases of the regions of the each target object based on the motion vectors of the current image frame; and
predicting next position information of the each target object in the next image frame based on the motion vector biases of the regions.

14. The device according to claim 11, wherein the at least one instruction is loaded and executed by the at least one processor to implement:
obtaining motion vector biases of the regions of the target object based on the motion vectors of the current image frame; and
predicting next position information of the target object in the next image frame based on the motion vector biases of the regions.

15. The device according to claim 14, wherein the at least one instruction is loaded and executed by the at least one processor to implement:
obtaining, for each region of the each target object, motion vectors of pixels in the region based on the motion vectors of the current image frame; and obtaining a motion vector bias of the region based on a total quantity of the pixels comprised in the region and the motion vectors of the pixels in the region.

16. The device according to claim 14, wherein the at least one instruction is loaded and executed by the at least one processor to implement:

translating the regions based on the motion vector biases of the regions, to obtain position information of the regions in the next image frame; and generating a bounding box surrounding the regions in the next image frame based on the predicted position information of the regions in the next image frame, to obtain the next position information of the each target object in the next image frame.

* * * * *